United States Patent
Zhicharevich et al.

(10) Patent No.: US 11,347,947 B2
(45) Date of Patent: May 31, 2022

(54) ENCODER WITH DOUBLE DECODER MACHINE LEARNING MODELS

(71) Applicant: Intuit Inc., Mountain View, CA (US)

(72) Inventors: Alexander Zhicharevich, Petah Tikva (IL); Noa Haas, Tel Aviv (IL); Oren Sar Shalom, Nes Ziona (IL)

(73) Assignee: Intuit Inc., Mountain View, CA (US)

( * ) Notice: Subject to any disclaimer, the term of this patent is extended or adjusted under 35 U.S.C. 154(b) by 187 days.

(21) Appl. No.: 16/938,311

(22) Filed: Jul. 24, 2020

(65) Prior Publication Data

US 2022/0027563 A1  Jan. 27, 2022

(51) Int. Cl.
G06F 40/30 (2020.01)
G06N 3/04 (2006.01)
G06F 40/289 (2020.01)
G06N 3/08 (2006.01)

(52) U.S. Cl.
CPC ............ *G06F 40/30* (2020.01); *G06F 40/289* (2020.01); *G06N 3/0445* (2013.01); *G06N 3/0454* (2013.01); *G06N 3/08* (2013.01)

(58) Field of Classification Search
None
See application file for complete search history.

(56) References Cited

U.S. PATENT DOCUMENTS

2020/0228307 A1\* 7/2020 Cheon .................. H04L 9/3093
2021/0306873 A1\* 9/2021 Mokrushin ............. H04L 41/14

OTHER PUBLICATIONS

See, A., et al., "Get to the Point: Summarization with Pointer-Generator Networks", Apr. 25, 2017, 20 pages.
Bahdanau, D., et al., "Neural Machine Translation by Jointly Learning to Align and Translate", ICLR 2015, May 19, 2016, 15 pages.
Sutskever, I., et al., "Sequence to Sequence Learning with Neural Networks", Dec. 14, 2014, 9 pages.
Liu, C., et al., "Automatic Dialogue Summary Generation for Customer Service", KDD '19, Aug. 4-8, 2019, 9 pages.

\* cited by examiner

*Primary Examiner* — Quynh H Nguyen
(74) *Attorney, Agent, or Firm* — Ferguson Braswell Fraser Kubasta PC

(57) ABSTRACT

Operating an encoder with double decoder machine learning models include executing, on a transcript, an encoder machine learning model to generate an encoder output, and executing a situation decoder machine learning model on the encoder output to obtain a situation model output having a situation identifier, and executing a trouble decoder machine learning model using the encoder output to obtain a trouble identifier. The method further includes outputting the situation identifier and the trouble identifier.

20 Claims, 6 Drawing Sheets

ENCODER WITH DOUBLE DECODER MACHINE LEARNING MODELS

BACKGROUND

Computers provide various support operations and analysis of human interactions. For example, when humans interact via an audio call, a computer may perform speech to text recognition in order to transform the audio portion of the audio call to a transcript. One of the problems encountered by computer analysis of human interaction is the presence of noise and the fact that humans do not naturally interact in a manner that is directly translatable to computers.

Noise can take the form of audio quality noise and human language noise. In the transcript, audio quality noise affects the accuracy of the transcript. With respect to human language noise, humans often use filler words and incomplete sentences. Further, humans may rapidly switch between topics and speak with emotional language.

Further, humans do not transmit information the same way as a computer. For example, humans do not use attribute name-value pairs nor do humans format their speech patterns to an agree upon format as computers would.

All of the foregoing makes computer-based analysis of conversational transcripts technically challenging. One area of technical challenge is in the computer summarization of an audio call. For example, computer summarization of a call center call includes determining a situation part and a trouble part of the audio call.

SUMMARY

In general, in one aspect, one or more embodiments relate to a method that includes executing, on a transcript, an encoder machine learning model to generate an encoder output, and executing a situation decoder machine learning model on the encoder output to obtain a situation model output having a situation identifier, and executing a trouble decoder machine learning model using the encoder output to obtain a trouble identifier. The method further includes outputting the situation identifier and the trouble identifier.

In general, in one aspect, one or more embodiments relate to a system includes a data repository storing a transcript, and a computer processor configured to execute instructions to perform operations. The operations include executing, on a transcript, an encoder machine learning model to generate an encoder output, and executing a situation decoder machine learning model on the encoder output to obtain a situation model output having a situation identifier, and executing a trouble decoder machine learning model using the encoder output to obtain a trouble identifier. The operations further includes outputting the situation identifier and the trouble identifier.

In general, in one aspect, one or more embodiments relate to a non-transitory computer readable medium comprising computer readable program code for causing a computer system to perform operations. The operations include executing, on a transcript, an encoder machine learning model to generate an encoder output, and executing a situation decoder machine learning model on the encoder output to obtain a situation model output having a situation identifier, and executing a trouble decoder machine learning model using the encoder output to obtain a trouble identifier. The operations further includes outputting the situation identifier and the trouble identifier.

Other aspects of the invention will be apparent from the following description and the appended claims.

DETAILED DESCRIPTION

Figure 1:
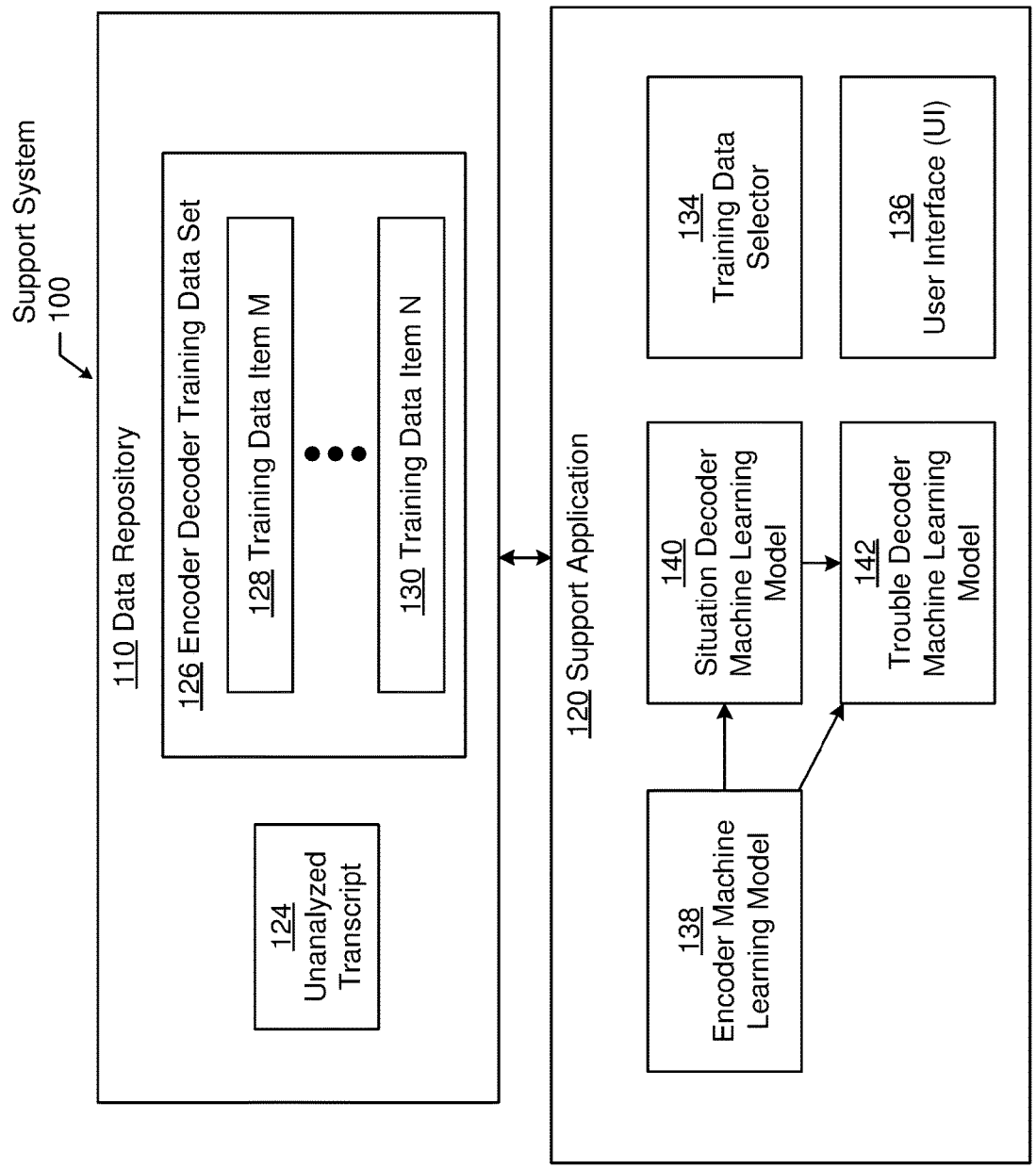
FIG. 1 shows a diagram of a system in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

From a user standpoint, call centers are a most immediate touching point between organizations and the organization's customers. The quality of service that an agent provides heavily affects customer satisfaction. Accordingly, improving the efficiency of agents can result in major savings as well as increased customer satisfaction. One place in which agents spend time is documenting a call. Thus, eliminating or mitigating agent documentation can be a significant efficiency boost for the agents' work. One of the most significant parts of the documentation is the description of the customer's issue.

From a technical standpoint, current audio call transcription techniques are not capable of separating the situation description part of the call from the trouble description part of the call. Specifically, transcripts are susceptible to noise and characteristics of human communication.

In general, embodiments of the invention are directed to a machine learning approach to computer summarization of a transcript. Specifically, embodiments are directed to an encoder and dual head decoder machine learning models to extract a situation part and trouble part of a transcript. The encoder machine learning model encodes a vector representation of a transcript. The vector representation may be of the complete transcript or an excerpt therefrom. The output of the encoder machine learning model is used as input to the dual head of a situation decoder machine learning model and a trouble decoder machine learning model. The situation decoder machine learning model is used to obtain a situation identifier. The trouble decoder machine learning model is used to obtain a trouble identifier. The situation identifier and the trouble identifier are output from the system.

The situation identifier and trouble identifier may be used for computer based analysis. For example, a computing system may use the metrics from the situation identifier and trouble identifier to perform computer based detection of errors and possible solutions.

FIG. 1 shows a schematic diagram of a support system (100) in accordance with one or more embodiments. As shown in FIG. 1, the support system (100) includes a data repository (110) connected to a support application (120). In one or more embodiments, the data repository (110) is a storage system for storing information. Information in the data repository (110) may be stored in whole or in part, temporarily or permanently, and/or together or separate. The data repository (110) includes at least one unanalyzed transcript (124) and an encoder decoder training data set (126).

The unanalyzed transcript (124) is a transcript of a call. The call is through any mode of communication. The transcript is a written record of the call. In one or more embodiments, the transcript may be a verbatim written recording of the call as captured by an audio recording. In one or more embodiments, the transcript is a preprocessed verbatim written recording of the call, such as to filter out filler words. In one or more embodiments, the transcript captures the words that each party uses to convey the information in the call.

A transcript may have a transcript excerpt. The transcript excerpt is an extracted portion of the transcript. In one or more embodiments, the transcript excerpt is an extracted contiguous portion of the call. In one or more embodiments, the excerpt may be an extracted portion that corresponds to a summary section of the transcript. An example of an excerpt is described in U.S. patent application Ser. No. 16/836,886 filed on Mar. 31, 2020, the description of which is incorporated herein by reference.

The unanalyzed transcript (124) is a transcript that is, in whole or in part, not yet analyzed through the encoder, decoders machine learning models (described below). Specifically, the unanalyzed transcript (124) is a target for obtaining a situation identifier and trouble identifier.

Figure 2:
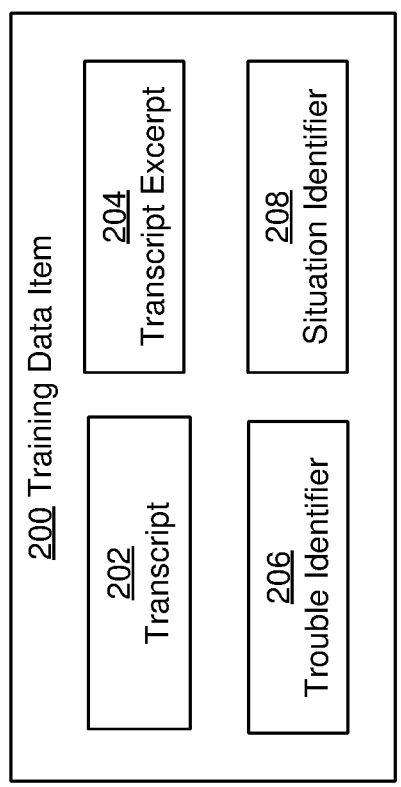
FIG. 2 shows a diagram of a training data item in accordance with one or more embodiments.

The encoder decoder training data set (126) is a set of training data items (e.g., training data item M (128), training data item N (130)) that may be used to train the encoder and decoders machine learning models (described below). A training data item is a collection of information about an actual call. For an audio call between a support agent and a customer, the training data item includes the captured information as well as the information entered by the support agent in one or more embodiments. FIG. 2 shows a schematic diagram of a training data item (200) in accordance with one or more embodiments.

As shown in FIG. 2, a training data item (200) includes a transcript (202), a transcript excerpt (204), a trouble identifier (206), and situation identifier (208). Each of these components is discussed below.

As discussed above, a transcript (202) is a written record of the parties to a call. The transcript excerpt (204) is a portion of the transcript as described above.

The situation identifier (208) and trouble identifier (206) may follow the S.T.A.R. (situation, trouble, action, resolution) format. The situation identifier (208) identifies the situation of a customer. Specifically, the situation is the summary of the problem the customer is trying to solve or the goal that the customer wants to achieve using the product supported by the support agent. As a summary of the problem or goal the customer wants to achieve, the situation describes a customer's desired outcome with the product. In one or more embodiments, the situation identifier (208) is in sentence form. The sentence may be a well formed grammatically correct sentence. In other embodiments, the situation identifier (208) may be an incomplete sentence.

The trouble identifier (206) is an identifier of a trouble part of the purpose of the call. The trouble identifier (206) identifies the trouble that a customer is having to achieve the goal defined by the situation. The trouble identifier (206) identifies the obstruction to achieving the desired outcome in the situation. The objective of the trouble identifier (206) is to not restate the goal as being unable to be achieved, but rather specifies the obstruction or hurdle to the goal. In the training data set, one or more of the training data items may have a trouble identifier (206) that is a restatement of the situation identifier (208) as not being achievable. The trouble identifier (206) is in sentence form. The sentence may be a well formed grammatically correct sentence. The trouble identifier (206) may be an incomplete sentence.

Returning to FIG. 1, a support application (120) is a software application that analyzes transcripts. The support application (120) includes a training data selector (134), an encoder machine learning model (138), a situation decoder machine learning model (140), a trouble decoder machine learning model (142), and a user interface (UI) (136). Each of these components is discussed below.

The training data selector (134) includes functionality to select a set of data items from the training data set (i.e., encoder decoder training data set (126)). The selection may be to filter data items that do not include model situation identifiers and trouble identifiers.

The encoder machine learning model (138), the situation decoder machine learning model (140), and the trouble decoder machine learning model (142) are in the deep learning machine learning models. Deep learning, also known as deep structured learning or hierarchical learning, is part of a broader family of machine learning methods based on learning data representations, as opposed to task-specific algorithms. The encoder machine learning model (138), the situation decoder machine learning model (140), and the trouble decoder machine learning model (142) may each be a neural network, such as a gated recurrent network (GRU), and recurrent neural networks (RNN). In other words, the system may have at least two neural networks, one for each of the encoder machine learning model (138), the situation decoder machine learning model (140), and the trouble decoder machine learning model (142).

A GRU and a RNN are networks that operate on a sequence and uses its own output as input for subsequent steps. The GRU and RNN may each be single or multiple layers. Further, the GRU or RNN may each be a long short-term memory (LSTM) network. The expression long short-term refers to the fact that LSTM is a model for the short-term memory which can last for a long period of time. An LSTM is well-suited to classify, process and predict time series given time lags of unknown size and duration between events. LSTM units are the building blocks of the layers of the neural network in one or more embodiments. Further, the encoder machine learning model (138) and the decoder machine learning models may form a sequence to sequence (seq2seq) network.

The encoder machine learning model (138) is a machine learning model that is configured to transform a transcript into encoder output. Specifically, the encoder machine learning model (138) transforms sentences and phrases into encoder output that is a context vector. The context vector is a vector representation of the transcript. The context vector is a hidden state of the encoder machine learning model (138) and encodes the meaning behind of the transcript. The contextual meaning is represented with numeric values in the context vector. In one or more embodiments, the context vector has fixed dimensionality. The size of the context vector is independent of the length of the transcript being encoded. In one or more embodiments, context vector is a numeric sequence.

The encoder machine learning model (138) includes a word to indices mapping. The word to indices mapping may be referred to as an encoder dictionary. The word to indices mapping maps individual words of the input to an index value. A set of words are selected based on frequency of use in the user support system. Each word in the set of words has a unique location in a vector space. The words to indices mapping defines the location of the words in the vector space. When mapping a transcript, each word is a one-hot vector, or giant vector of zeros except for a single one at the index of the word. Thus, for example, the word to indices mapping may map the word "problem" in the phrase "I am having a problem with . . . " to 05, which is represented by the vector [0 0 0 0 0 1 0 0 0 . . . ].

The situation decoder machine learning model (140) is a machine learning model that is configured to decode the encoder output to obtain a situation identifier. The trouble decoder machine learning model (142) is a machine learning model that is configured to decode the encoder output and obtain a trouble identifier. In one or more embodiments, the trouble decoder machine learning model (142) further uses the output of the situation decoder machine learning model (140) as input.

Similar to the encoder machine learning model (138), the situation decoder machine learning model (140) and the trouble decoder machine learning model (142) each include an indices to word mapping. The indices to word mapping has the same characteristics as described with respect to the word to indices mapping. The indices to word mapping maps index values to words. The indices to word mapping may be referred to as a decoder dictionary. The encoder dictionary and the decoder dictionary may be the same in one or more embodiments. For example, the encoder dictionary may represent the same set of words as the decoder dictionary. By way of another example, the same word in the encoder dictionary and the decoder dictionary may be mapped to the same index values in the different dictionaries.

Continuing with FIG. 1, the user interface (UI) (136) is configured to interface with a user to present the situation identifier and the trouble identifier. The UI (136) may be a graphical user interface. Although not shown in FIG. 1, the support application (120) may include an application programing interface (API) and/or a storage interface. The API is configured to interface with other applications to provide output (e.g., transcript, situation identifier, trouble identifier) to the other applications. The storage interface is configured to interface with a storage device to provide output to the storage device.

While FIG. 1 and FIG. 2 show a configuration of components, other configurations may be used without departing from the scope of the invention. For example, various components may be combined to create a single component. As another example, the functionality performed by a single component may be performed by two or more components.

Figure 3:
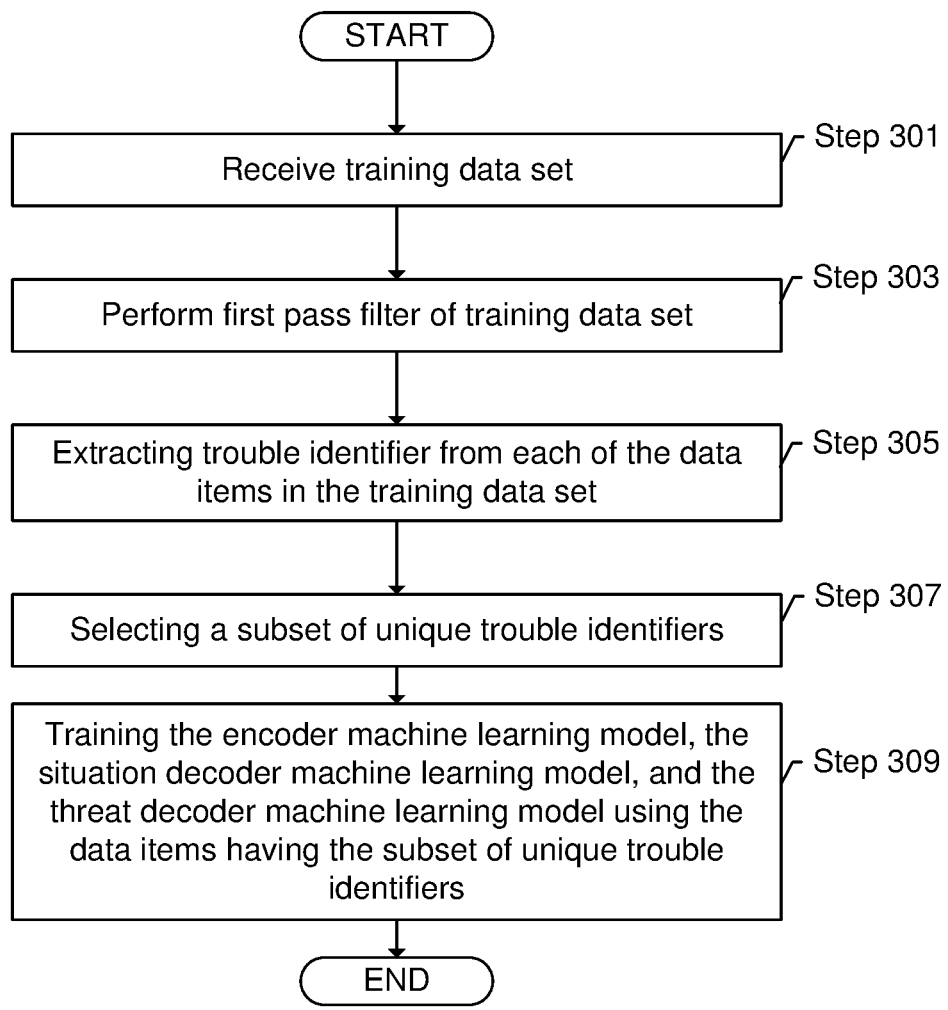
FIG. 3 shows a flowchart for training an encoder with double decoder machine learning model in accordance with one or more embodiments.
Figure 4:
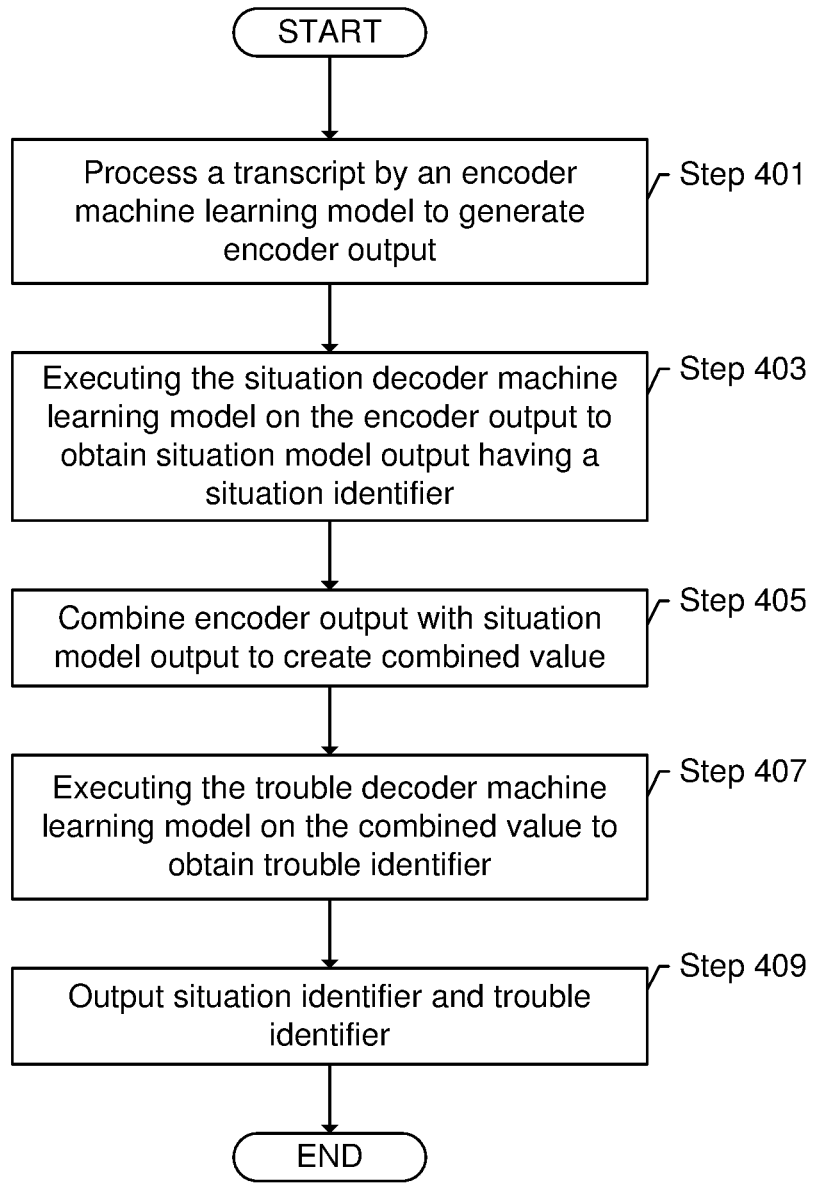
FIG. 4 shows a flowchart for executing an encoder with double decoder machine learning model in accordance with one or more embodiments.

FIG. 3 and FIG. 4 show flowcharts in accordance with one or more embodiments. FIG. 3 shows a flowchart for training an encoder and dual head decoder machine learning models. FIG. 4 shows a flowchart for the encoder and dual head decoder machine learning models to determine a situation identifier and trouble identifier for an unanalyzed transcript. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively.

In Step 301, a training data set is received. While calls are being made, audio recordings are stored for the calls. Transcripts of the audio recordings are generated, such as by the support application. Known techniques for speech recognition, such as using recurrent neural networks, may be used to generate a transcript from an audio recording. The transcript may further be filtered to remove filler words, private information, and other data. In some embodiments, an excerpt of the transcript is extracted. The excerpt represents the contiguous portion of the transcript that is deemed to be representative of the transcript. Extracting a transcript is described in an example of an excerpt is described in U.S. patent application Ser. No. 16/836,886 filed on Mar. 31, 2020. U.S. patent application Ser. No. 16/836,886 filed on Mar. 31, 2020 is incorporated herein by reference. During or after a call, a support agent may document the call. As part of the documentation, the support agent submits a situation identifier and a trouble identifier. Thus, each of the training data sets has a situation identifier and trouble identifier. At this stage, the training data set may have inconsistent levels of precision. For example, some training data items may be well-formed. The well-formed training data items have complete sentences that include precise situation identifier and trouble identifier. The well-formed training data items have well-articulated situation identifiers and trouble identifiers. Other training data items in the set may have incomplete information, incomplete sentences, trouble identifiers that are redundant of the corresponding situation identifier, and other errors. Other training data items may have a level of precision that is in between being well formed and flawed.

In Step 303, a first pass filter of the training data set is performed. The first pass filter may remove and training data items that are missing a component (e.g., situation identifier, trouble identifier) or are too short. The first pass filter may further normalize the training data items, such as by extracting the situation identifier and trouble identifier from the written summary.

In Step 305, trouble identifiers are extracted from each of the data items in the training data set. The extracted trouble identifiers are related to the corresponding training data item.

In Step 307, a subset of unique trouble identifiers is selected. Specifically, trouble identifiers that are unique from other trouble identifiers are selected. Uniqueness may be defined as having outside of a threshold degree of similarity. For the purposes of comparison, terms in the trouble identifier may be transformed to their root terms prior to comparison, and stop words may be removed. If more than a threshold number or percentage of words are the same between two trouble identifiers, then the trouble identifiers may be deemed non-unique. Conversely, if less than a threshold number or percentage of words are the same between a trouble identifier and each other trouble identifier, the trouble identifier may be consider unique.

The reason for selecting a unique subset of trouble identifiers is as follows. The trouble identifiers have significantly higher variety amongst the various trouble identifiers than the situation identifiers amongst the various situation identifiers. Specifically, the situation identifier is usually from a limited set of functions performed by a particular product. In other words, a product only has a relatively limited number of functions that the product is capable of performing. Further, the phrasing of the situation identifier is generally in a constant form.

Comparatively, trouble identifiers may be far more diverse. In particular, customers have a myriad of different ways in which the customer may have challenges or try performing a particular function being offered. Further, there may be many possible states of the product when the customer is trying to perform the particular function with the product. Additionally, the same trouble by different customers may have multiple difference phrasings for the trouble identifier. Moreover, the length of the trouble identifier may be much longer than the length of the situation identifier as the context of the customer's trouble is specified. Selecting training data items having unique trouble identifiers for the training helps to filter poorly phrased trouble identifiers (e.g., where the call agent only states, "customer doesn't know how" or "customer needs help."). Thus, the uniqueness of the trouble identifier is an indicator that the agent has documented the trouble identifier correctly. In turn, the uniqueness of the trouble identifier is also an indicator of the correctness of the situation identifier because the situation identifier is usually easier to write.

Continuing with FIG. 3, in Step 309, the encoder machine learning model, the situation decoder machine learning model, and the thread decoder machine learning model are trained using the data items having the subset of unique trouble identifiers. The subset of the training data items that match the selected subset of trouble identifiers, which were selected in Step 307, are identified. The training data set are filtered to only include the identified subset. The filtered training data set is used to train the machine learning models. The training may be performed by executing the encoder machine learning model and then the decoder machine learning model on the transcripts in the filtered training data set. The outputted situation identifiers and trouble identifiers are compared against the corresponding actual situation identifiers and trouble identifiers in the filtered training data set. A loss function is applied to differences between the outputted situation identifiers and trouble identifiers and the corresponding actual situation identifiers and trouble identifiers in the filtered training data set. A gradient decent algorithm may be used to update weights in the encoder machine learning model, the situation decoder machine learning model, and the thread decoder machine learning model. By way of an example, the gradient decent algorithm may be the Adam (Adaptive Moment Estimation) algorithm. The process is repeated until the encoder machine learning model, the situation decoder machine learning model, and the thread decoder machine learning model are deemed sufficiently trained (e.g., correctly outputs a matching situation identifier and trouble identifier a threshold number of times).

FIG. 4 shows a flowchart for processing an unanalyzed transcript. As described above, the unanalyzed transcript may be an excerpt of the transcript. In Step 401, a transcript is processed by the encoder machine learning model to generate encoder output. Specifically, machine learning is applied to the transcript to transform the transcript into a context vector. The encoder dictionary is applied to the transcript to obtain the indices for the words of the transcript. The indices are used to create vectors for the words. Through several layers of the encoder machine learning model, the encoder creates output and a hidden state. The last hidden state is the context vector. The last output may be ignored. Thus, the encoder machine learning model receives, as input, the variable-length input sequence, and outputs a fixed-length context vector. The context vector is a feature vector representing the input sequence. Thus, the encoder machine learning model is responsible for stepping through the input in timesteps and encoding the entire sequence into a fixed length vector called a context vector. Each timestep corresponds to a processing of a portion of the input, where portions are processed in order. For example, the portion may be a word in the input. The context vector is the encoder output that is then used by the situation decoder machine learning model.

In Step 403, the situation decoder machine learning model is executed on the encoder output to obtain situation model output having a situation identifier. The situation decoder machine learning model has a similar structure as the encoder machine learning model but in opposite orientation. The situation decoder machine learning model takes the encoder output as the first hidden state and creates a variable-length sequence. At the end of processing, the variable length sequence is a set of vectors having a one at a particular location. The situation decoder dictionary is applied to the set of vectors to obtain words that are in the defined language but is different than the transcript. The words decoded by the situation decoder machine learning model is the situation identifier. Thus, the situation decoder machine learning model is responsible for stepping through the output time steps while reading from the context vector.

In one or more embodiments, through several layers of the situation decoder machine learning model, the situation decoder machine learning model creates output and a last hidden state. The last hidden state is a context vector of the situation decoder machine learning model and may be referred to as a situation model output.

In Step 405, the encoder output is combined with the situation model output to create a combined value. In one or more embodiments, the situation model output is concatenated with the encoder output to create a combined value. For example, the encoder output may be a first set of bits in the combined value and the situation model output may be a second set of bits in the combined value. Other concatenations or combinations may be used without departing from the scope of the invention.

In Step 407, the trouble decoder machine learning model is executed on the combined value to obtain a trouble identifier. The trouble decoder machine learning model has a similar structure as the situation decoder machine learning model. The trouble decoder machine learning model takes the combined value as the first hidden state and creates a variable-length sequence. At the end of processing, the variable length sequence is a set of vectors having a one at a particular location. The trouble decoder dictionary is applied to the set of vectors to obtain words that are in the defined language but is different than the situation identifier and the transcript. The words decoded by the trouble decoder machine learning model is the trouble identifier.

Thus, the decoder machine learning model steps through the time steps while reading from the combined value.

In one or more embodiments, a beam search is used during decoding by the situation decoder machine learning model and the trouble decoding machine learning model. The beam search is performed as follows.

The situation decoder machine learning model and the trouble decoding machine learning model (i.e., decoders) generate a set of most probable next terms. The number of terms in the set is configurable. For example, the decoder may generate the five most probable next terms. Each term has an associated probability. The terms are appended to the set of previous terms in the preceding output to create multiple beams. Appending the term is performed by individually appending each term to each beam. Multiplication of the probabilities of the beams create a joint probability. When the joint probability of a beam is below a threshold, the beam is removed from a set of possible beams. In some embodiments, a number of the most probable beams are kept for each iteration.

Continuing with FIG. 4, in Step 409, a situation identifier and trouble identifier are outputted. Outputting the situation identifier and trouble identifier may be performed by saving the situation identifier and trouble identifier with the transcript. The situation identifier and trouble identifier may be presented to a user.

Figure 5:
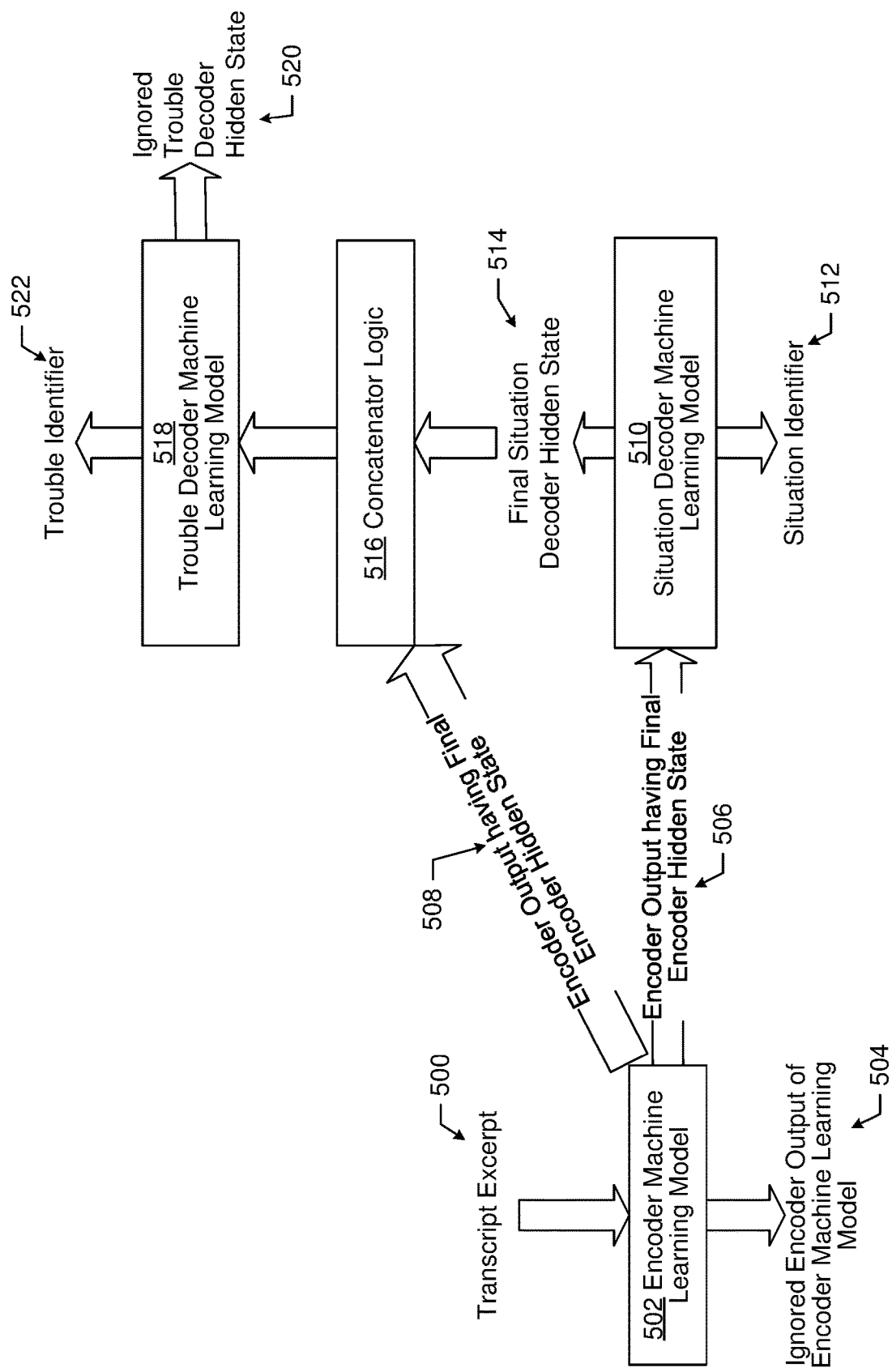
FIG. 5 shows an example in accordance with one or more embodiments.

FIG. 5 shows an example in accordance with one or more embodiments. The following example is for explanatory purposes only and is not intended to limit the scope of the invention. In the example, a transcript excerpt (500) is used as input to an encoder machine learning model (502). The encoder machine learning model (502) encodes the transcript excerpt (500) to a set of word indices x0, x1, ... xi, xi+1 ... xn, where, for xi, x is the index of ith word in the transcript. The encoder output of the encoder machine learning model is ignored (504). The encoder machine learning model (502) creates an encoder output having a final encoder hidden state (506, 508), which is a vector in multi-dimensional space.

The encoder output having a final encoder hidden state is passed (506) to a situation decoder machine learning model (510) and is passed (508) to concatenator logic (516). The situation decoder machine learning model (510) receives the encoder output (506) in the vector multi-dimensional space. Through several iterative time steps, the encoder output is decoded to a new set of word indices to produce the situation identifier (512).

The situation decoder machine learning model (510) creates several situation decoder hidden states as the situation decoder machine learning model (510) operates. The final situation decoder hidden state (514) is used as input to concatenator logic (516). The concatenator logic (516) combines the encoder output (508) with the final situation decoder hidden state (514) to create combined output. The combined output is used as input to the trouble decoder machine learning model (518).

The trouble decoder machine learning model (518) iterates through several timestamps. The trouble decoder machine learning model (518) creates output that includes a trouble decoder hidden state (520), which is ignored, and a trouble identifier (522). The trouble identifier (522) and the situation identifier (512) are provided as output.

Figure 6A:
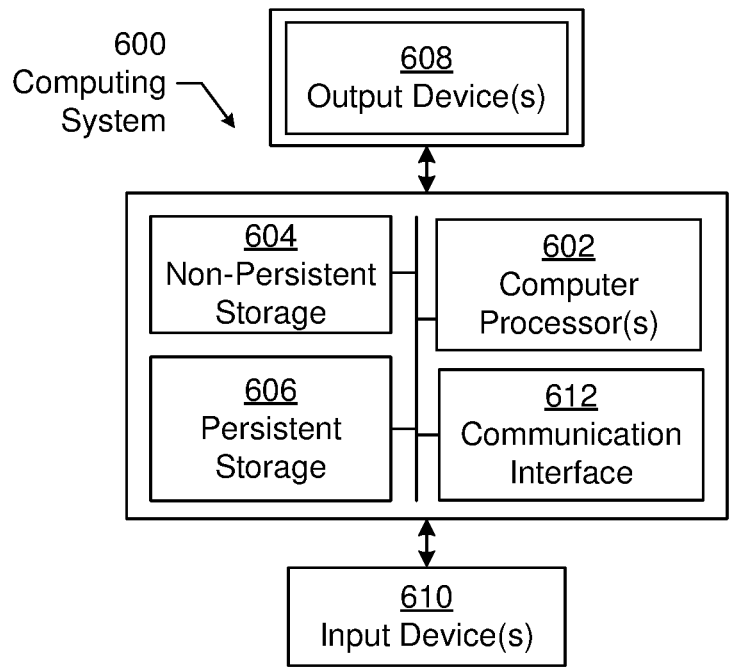
FIG. 6A and FIG. 6B show a computing system in accordance with one or more embodiments.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities that implement the features and elements of the disclosure.

The computer processor(s) (602) may be an integrated circuit for processing instructions. For example, the computer processor(s) (602) may be one or more cores or micro-cores of a processor. The computing system (600) may also include one or more input device(s) (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, a mobile network, or any other type of network) and/or to another device, such as another computing device.

Further, the computing system (600) may include one or more output device(s) (608), such as a screen (e.g., a liquid crystal display (LCD), a plasma display, touchscreen, cathode ray tube (CRT) monitor, projector, or other display device), a printer, an external storage, or any other output device. One or more of the output device(s) (608) may be the same or different from the input device(s) (610). The input and output device(s) (610 and 608) may be locally or remotely connected to the computer processor(s) (602), non-persistent storage (604), and persistent storage (606). Many different types of computing systems exist, and the aforementioned input and output device(s) (610 and 608) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, a flash memory, a physical memory, or any other computer readable storage medium. Specifically, the software instructions may correspond to computer readable program code that, when executed by a processor(s), is configured to perform one or more embodiments of the invention.

Figure 6B:
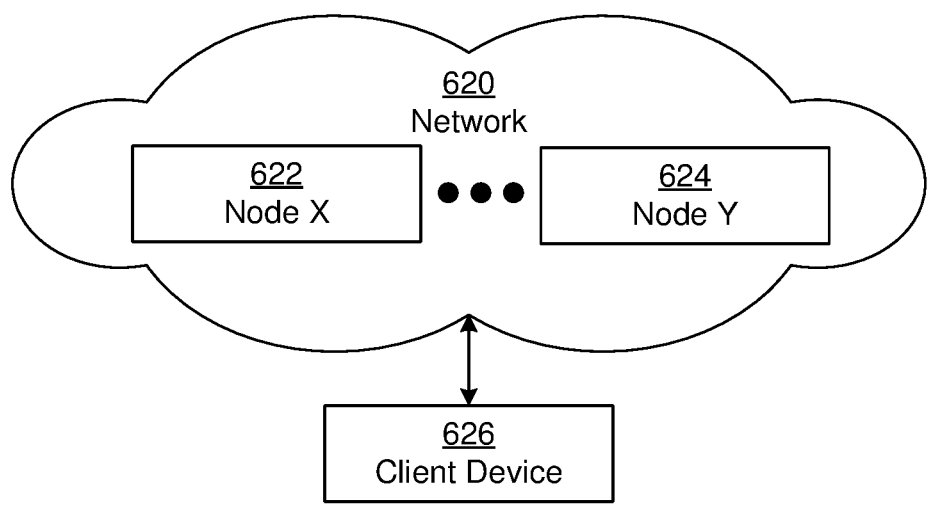

The computing system (600) in FIG. 6A may be connected to or be a part of a network (620). For example, as shown in FIG. 6B, the network (620) may include multiple nodes (e.g., node X (622), node Y (624)). Each node may correspond to a computing system, such as the computing system (600) shown in FIG. 6A, or a group of nodes combined may correspond to the computing system (600) shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network (620).

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (526). For example, the nodes may be part of a cloud computing system. The nodes may include functionality to receive requests from a client device (626) and transmit responses to the client device (626). The client device (626) may be a computing system, such as the computing system (600) shown in FIG. 6A. Further, the client device (626) may include and/or perform all or a portion of one or more embodiments of the invention.

The computing system (600) or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of words (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (600) in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (600) of FIG. 6A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A–B), and the status flags may be read to determine if the result is positive (i.e., if A>B, then A–B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (600) in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (600) of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (600) of FIG. 6A and the nodes (e.g., node X (622), node Y (624)) and/or client device (626) in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
executing, on a transcript, an encoder machine learning model to generate an encoder output;
executing a situation decoder machine learning model on the encoder output to obtain a situation model output having a situation identifier;
executing a trouble decoder machine learning model using the encoder output to obtain a trouble identifier; and
outputting the situation identifier and the trouble identifier.

2. The method of claim 1, further comprising:
combining the encoder output with the situation model output to create a combined value, and
wherein executing the trouble decoder machine learning model is performed on the combined value.

3. The method of claim 2, wherein the situation model output comprises the situation identifier and a final situation decoder hidden state, and wherein the final situation decoder hidden state is combined with the encoder output to create the combined value.

4. The method of claim 1, wherein the encoder output comprises an ignored encoder output and a final encoder hidden state, and wherein the final encoder hidden state is used in execution of the situation decoder machine learning model.

5. The method of claim 1, wherein the encoder output comprises an ignored encoder output and a final encoder hidden state, and wherein the final encoder hidden state is used in execution of the trouble decoder machine learning model.

6. The method of claim 1, further comprising:
extracting a plurality of trouble identifiers from a plurality of data items in a training data set, the plurality of data items comprising the plurality of trouble identifiers, a plurality of situation identifiers, and at least a portion of a plurality of transcripts;
selecting, from the plurality of data items, a subset of the plurality of data items corresponding to a unique subset of the plurality of trouble identifiers; and
training the situation decoder machine learning model and the trouble decoder machine learning model using the subset of the plurality of data items.

7. The method of claim 1, further comprising:
extracting a transcript excerpt from the transcript,
wherein executing the encoder machine learning model is performed on only the transcript excerpt.

8. The method of claim 1, wherein the trouble decoder machine learning model and the situation decoder machine learning model have a shared attention layer.

9. The method of claim 1, further comprising:
performing a beam search while executing the trouble decoder machine learning model.

10. The method of claim 1, further comprising:
for each of a plurality of timestamps,
maintaining a set of decoded phrases to a current position;
executing, using the set of decoded phrases, the trouble decoder machine learning model for the current position to obtain a plurality of possible terms for the current position;
determining a probability for each of the plurality of possible terms being appended to each of the set of decoded phrases; and
updating the set of decoded phrases with the plurality of possible terms based on the probability.

11. The method of claim 10, wherein updating the set of decoded phrases comprises reducing the set of decoded phrases to a predefined number of decoded phrases based on the probability.

12. The method of claim 1, wherein the encoder machine learning model is a gated recurrent network (GRU).

13. A system comprising:
a data repository storing a transcript; and
a computer processor configured to execute instructions to perform operations, the operations comprising:
executing, on a transcript, an encoder machine learning model to generate an encoder output,
executing a situation decoder machine learning model on the encoder output to obtain a situation model output having a situation identifier,
executing a trouble decoder machine learning model using the encoder output to obtain a trouble identifier, and
outputting the situation identifier and the trouble identifier.

14. The system of claim 13, wherein the operations further comprise:
combining the encoder output with the situation model output to create a combined value, and
wherein executing the trouble decoder machine learning model is performed on the combined value.

15. The system of claim 13, wherein the encoder output comprises an ignored encoder output and a final encoder hidden state, and wherein the final encoder hidden state is used in execution of the situation decoder machine learning model.

16. The system of claim 13, wherein the operations further comprise:
extracting a plurality of trouble identifiers from a plurality of data items in a training data set, the plurality of data items comprising the plurality of trouble identifiers, a plurality of situation identifiers, and at least a portion of a plurality of transcripts;
selecting, from the plurality of data items, a subset of the plurality of data items corresponding to a unique subset of the plurality of trouble identifiers; and
training the situation decoder machine learning model and the trouble decoder machine learning model using the subset of the plurality of data items.

17. The system of claim 13, wherein the operations further comprise:
extracting a transcript excerpt from the transcript,
wherein executing the encoder machine learning model is only on the transcript excerpt.

18. The system of claim 13, wherein the trouble decoder machine learning model and the situation decoder machine learning model have a shared attention layer.

19. The system of claim 13, wherein the operations further comprise:
for each of a plurality of timestamps,
maintaining a set of decoded phrases to a current position;
executing, using the set of decoded phrases, the trouble decoder machine learning model for the current position to obtain a plurality of possible terms for the current position;
determining a probability for each of the plurality of possible terms being appended to each of the set of decoded phrases; and
updating the set of decoded phrases with the plurality of possible terms based on the probability.

20. A non-transitory computer readable medium comprising computer readable program code for causing a computer system to perform operations, the operations comprising:
- executing, on a transcript, an encoder machine learning model to generate an encoder output;
- executing a situation decoder machine learning model on the encoder output to obtain a situation model output having a situation identifier;
- executing a trouble decoder machine learning model using the encoder output to obtain a trouble identifier; and
- outputting the situation identifier and the trouble identifier.

\* \* \* \* \*